US010291391B2

(12) United States Patent
Yanamandra et al.

(10) Patent No.: US 10,291,391 B2
(45) Date of Patent: May 14, 2019

(54) METHOD FOR ENHANCED SECURITY OF COMPUTATIONAL DEVICE WITH MULTIPLE CORES

(71) Applicant: GIESECKE & DEVRIENT GMBH, München (DE)

(72) Inventors: Sai Yanamandra, Pune (IN); Vineet Kulkarni, Pune (IN); Shrikanthrao Kulkarni, Pune (IN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 120 days.

(21) Appl. No.: 15/316,267

(22) PCT Filed: Jun. 4, 2014

(86) PCT No.: PCT/EP2014/001518
§ 371 (c)(1),
(2) Date: Dec. 5, 2016

(87) PCT Pub. No.: WO2015/185071
PCT Pub. Date: Dec. 10, 2015

(65) Prior Publication Data
US 2017/0155502 A1 Jun. 1, 2017

(51) Int. Cl.
*H04L 9/00* (2006.01)
*G06F 21/75* (2013.01)
(Continued)

(52) U.S. Cl.
CPC ............ *H04L 9/003* (2013.01); *G06F 9/4881* (2013.01); *G06F 21/755* (2017.08); *H04L 9/004* (2013.01);
(Continued)

(58) Field of Classification Search
None
See application file for complete search history.

(56) References Cited

U.S. PATENT DOCUMENTS 5,560,028 A * 9/1996 Sachs ................... G06F 9/3802
712/23
6,839,849 B1 1/2005 Ugon et al.
(Continued)

FOREIGN PATENT DOCUMENTS

EP 1569118 A2 8/2005
EP 1802024 A2 6/2007
(Continued)

OTHER PUBLICATIONS

Manferdelli et al.; Challenges and Opportunities in Many-Core Computing; 2008; Retrieved from the Internet <URL: https://ieeexplore.ieee.org/document/4484943/?part=1; pp. 1-8, as printed. (Year: 2008).*

(Continued)

*Primary Examiner* — Saleh Najjar
*Assistant Examiner* — Michael W Chao
(74) *Attorney, Agent, or Firm* — Workman Nydegger

(57) ABSTRACT

A method to protect computational, in particular cryptographic, devices having multi-core processors from DPA and DFA attacks is disclosed herein. The method implies: Defining a library of execution units functionally grouped into business function related units, security function related units and scheduler function related units; Designating at random one among the plurality of processing cores on the computational device to as a master core for execution of the scheduler function related execution units; and Causing, under control of the scheduler, execution of the library of execution units, so as to result in a randomized execution flow capable of resisting security threats initiated on the computational device.

12 Claims, 2 Drawing Sheets

Schematic representation of execution scenario

(51) Int. Cl.
*G06F 9/48* (2006.01)
*G06F 9/50* (2006.01)
(52) U.S. Cl.
CPC ............. *G06F 9/50* (2013.01); *G06F 9/5027* (2013.01); *H04L 2209/08* (2013.01); *H04L 2209/125* (2013.01)

(56) References Cited

U.S. PATENT DOCUMENTS

| | | | |
|---|---|---|---|
| 7,290,289 B2 | 10/2007 | Janke et al. | |
| 7,430,293 B2 | 9/2008 | Elbe et al. | |
| 8,369,520 B2 | 2/2013 | Elbe et al. | |
| 9,378,363 B1* | 6/2016 | Patel | G06F 21/55 |
| 10,037,225 B2* | 7/2018 | Jeong | G06F 9/4881 |
| 10,061,593 B2* | 8/2018 | Shifer | G06F 9/30076 |
| 2004/0105541 A1 | 6/2004 | Elbe et al. | |
| 2005/0138485 A1* | 6/2005 | Osecky | G06F 11/1497 714/48 |
| 2007/0294512 A1* | 12/2007 | Crutchfield | G06F 8/443 712/200 |
| 2008/0077993 A1* | 3/2008 | Zimmer | G06F 9/5077 726/27 |
| 2008/0140739 A1 | 6/2008 | Elbe et al. | |
| 2009/0010424 A1* | 1/2009 | Qi | G06F 7/723 380/28 |
| 2009/0271141 A1* | 10/2009 | Coskun | G06F 1/206 702/132 |
| 2010/0180101 A1* | 7/2010 | Trumler | G06F 9/4856 712/30 |
| 2011/0285420 A1* | 11/2011 | Deas | H04L 9/003 326/8 |
| 2012/0060170 A1* | 3/2012 | Vajda | G06F 9/4893 718/104 |
| 2012/0291040 A1* | 11/2012 | Breternitz | G06F 9/5083 718/104 |
| 2012/0297163 A1* | 11/2012 | Breternitz | G06F 9/4856 712/22 |
| 2013/0081045 A1* | 3/2013 | Jeong | G06F 9/5083 718/104 |
| 2013/0167152 A1* | 6/2013 | Jeong | G06F 9/4881 718/102 |
| 2013/0268742 A1* | 10/2013 | Yamada | G06F 9/5044 712/226 |
| 2014/0129808 A1* | 5/2014 | Naveh | G06F 9/4856 712/225 |
| 2014/0189862 A1* | 7/2014 | Kruglick | G06F 21/55 726/22 |
| 2014/0359335 A1* | 12/2014 | Seo | G06F 1/3234 713/324 |
| 2015/0134973 A1* | 5/2015 | Maytal | G06F 21/556 713/190 |
| 2017/0220384 A1* | 8/2017 | Anderson | G06F 9/5005 |
| 2017/0286674 A1* | 10/2017 | Gathala | G06F 3/0623 |

FOREIGN PATENT DOCUMENTS

| | | |
|---|---|---|
| WO | 0248845 A2 | 6/2002 |
| WO | 2010038096 A1 | 4/2010 |

OTHER PUBLICATIONS

Cho et al.; Signal Processing Methods and Hardware-Structure for On-line Characterization of Thermal Gradients in Many-Core Processors; 2010; Retrieved from the Internet <URL: https://ieeexplore.ieee.org/abstract/document/5450486/; pp. 1-7, as printed. (Year: 2010).*

Huang et al., "Orthrus: Efficient Software Integrity Protection on Multi-Cores," ACM Sigarch Computer Architecture News, Jan. 1, 2010, pp. 371-383, vol. 38.

International Search Report for corresponding International PCT Application No. PCT/EP2014/001518, dated Feb. 2, 2015.

Zhang et al., "Randomized Execution Algorithms for Smart Cards to Resist Power Analysis Attacks," Journal of Systems Architecture, Nov. 1, 2012, pp. 426-438, vol. 58.

* cited by examiner

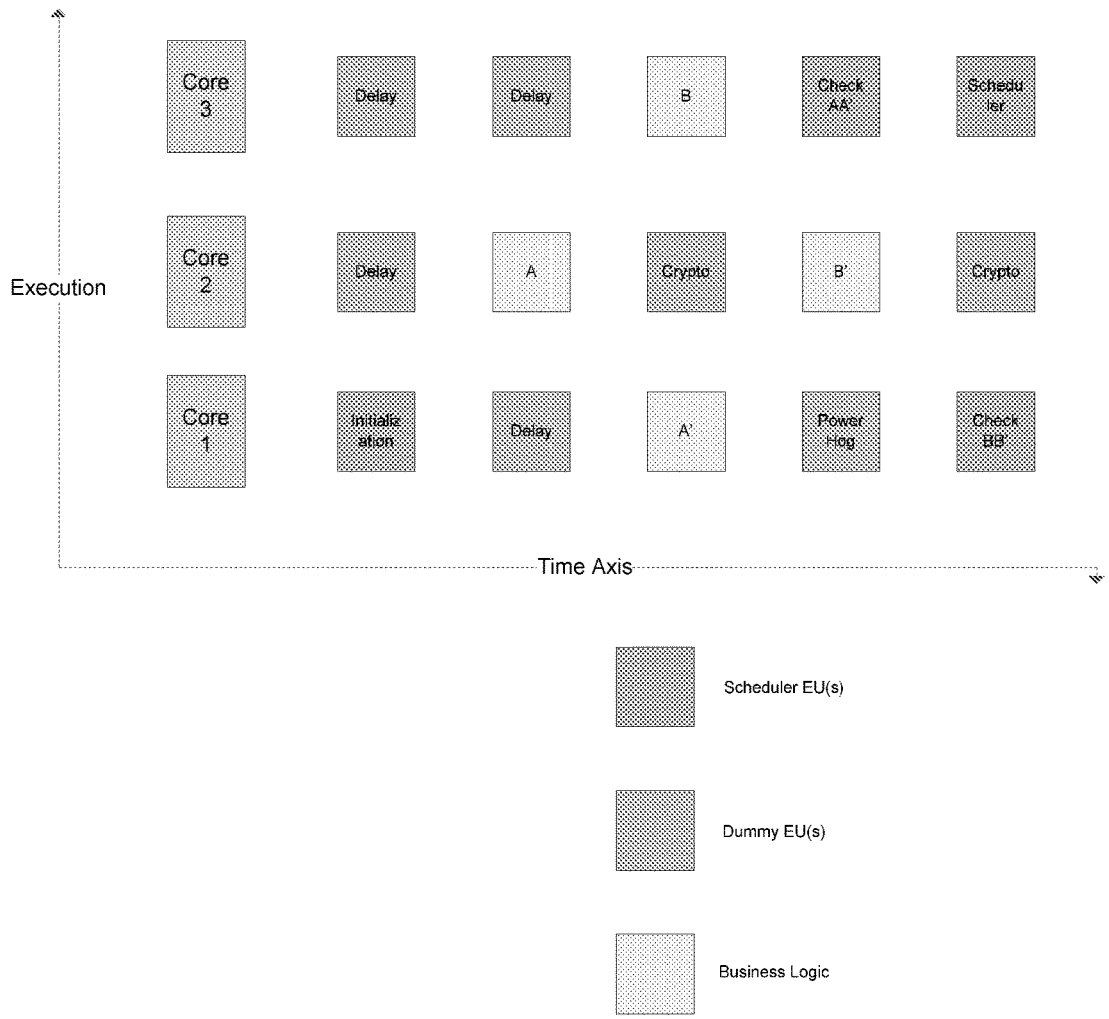
Fig 1: Schematic representation of execution scenario

| Principle / Countermeasure of the present invention | Security threats avoided | Hardware detectors avoided by the present invention | Software countermeasures avoided by the present invention |
|---|---|---|---|
| Redundant + Randomized + Delayed / punctuated execution scenario | Skipping Execution Logic | Checking results of execution by two cores at regular intervals | Flow control |
| | Disturbing the processor | Light detector in micro controller | Flow Control |
| | Erasing the EEPROM using UV Light to resetting counters / interfere with its operation at critical points | Photo Sensor | None |
| | switching off the supply voltage during PIN testing to write the retry counter | Voltage and Thermal Sensors | Incrementing the retry counter before performing the PIN test |
| | stopping the clock to analyze the RAM and drawing conclusions about the RAM content | Frequency Sensor, RAM Encryption/Decryption | None |
| | SPA/DPA | using processors with constant current consumption | Introduction of random driver delays, precautionary measures in software |

Fig 2: List of security attacks capable of being resisted by method of the present invention

METHOD FOR ENHANCED SECURITY OF COMPUTATIONAL DEVICE WITH MULTIPLE CORES

FIELD OF THE INVENTION

The present invention relates to a method for protecting a computational device, in particular a cryptographic computational device, from DPA and DFA attacks according to preamble of claim 1. Also disclosed is an improved computational device, being a smart card in particular, incorporating said protective mechanisms.

BACKGROUND OF THE INVENTION

Cryptographic computational devices have many applications both for the secure transmission of information and for the authentication and verification of the source of information. One application of a cryptographic computational device or system is a smart card, which contains valuable financial and personal data which intended to be kept secret via encryption. These devices, for reason of unauthorized access and/or unlawful benefit, are made object of attacks for extracting their encrypted confidential information, and as a consequence, the security level of said devices may be compromised. Once this event occurs, the attacker can access the otherwise restricted information and capabilities of the device and is then at liberty to engage in malicious activities including authorization of monetary transactions, impersonation of digital signatures and so on. With the global increase in the use of cryptographic computational devices such as chip-based cards or special ICs for electronic identification and authentication protocols, it has become necessary for cryptographic devices to be tamper-proof by advantageous incorporation of features resistive to aforementioned attacks that concede data security.

Not only for smart cards, also for other computational devices such as mobile phones, DPA and DFA attacks area a threat.

Cryptographic algorithms that normally go into the devices mentioned above are usually designed not to reveal their inputs and/or outputs. However, cryptographic keys and computational intermediates of these algorithms may be open to access by an attacker thus revealing the analyze intended and so compromising the security of the cryptographic device involved. Among classes of effective attacks known to be used with such intent, Differential Power Analysis (DPA) and Differential fault analysis (DFA) attacks are recognized as non-physical, non-invasive attacks which can be easily automated and can be mounted without knowing design of the target device. It would be therefore highly desirable to have mechanisms specifically resistive towards said attacks and yet be independent of the hardware involved.

Fundamentally, DPA is a class of attacks allowing extraction of encrypted information/cryptographic keys present on cryptographic devices such as smart cards by analyzing the power consumption of said devices and performing a statistical analysis on the measured data. This type of attack is based on the principle that as the cryptographic processor performs its cryptographic functions, such as encryption or signing, transistors comprising the processor switch on and off, which changes the amount of current drawn from the source supplying power to the processor. The attacker can correlate the current changes with data being processed and thus gain information on the crypto keys being used. In other words, a DPA attack is an exploit based on an analysis of the correlation between the electricity usage of a chip in a smart card and the encryption key it contains. As data is collected by monitoring the power emanations of the device under attack, physical access to the device being attacked is not necessary. In practice, small inductive probes or antennae placed adjacent to the device being attacked are sufficient for implementation of the attack.

DFA, on the other hand, is a type of side channel attack where the principle is to induce faults or unexpected environmental conditions into cryptographic implementations, so as to reveal their internal states. Using DFA attacks, secret keys for cryptographic algorithms can be determined by selectively introducing scattered computation errors in the processor. For example, high temperature, unsupported supply voltage or current, excessively high overclocking, strong electric or magnetic fields, ionizing radiation may be used to influence operation of the processor on-board the cryptographic device which then begins to output incorrect results due to physical data correction thus revealing that the processor is running and details of its internal data state. Effective countermeasures to DPA and/or DFA types of attacks are hence acutely required for security of any product which needs to protect cryptographic keys and other secret information from being leaked.

PRIOR ART

Attempts at addressing the needs mentioned hereinabove find mention in prior art. Many countermeasures have been proposed to defend cryptographic computational devices from DPA and/or DFA attacks. These are mostly based on vulnerability or error detection schemes or introduction of randomness, noise or continual modification of execution protocols. These countermeasures make the attack much more difficult by decreasing the amount of information obtained from each sampling of the power line signal. However, an attacker can overcome them by obtaining more samples of power line fluctuations and applying more sophisticated analytical techniques.

U.S. Pat. No. 7,430,293 B2 teaches architecture of cryptography processors used for cryptographic applications in which a plurality of calculating subunits and at least one arithmetic unit are subject to a single control unit which divides and schedules operations across the calculating subunits to result in a series of computational intermediates not necessarily obtained in a sequence to allow the attacker to readily arrive at the secret analyze. However, this system is not able to detect and provide countermeasures to DFA attacks.

EP1569118B1 discloses a method for safe calculation of a result in a microprocessor system where parallel computations are undertaken for arriving at the same computational result. Upon comparison, if results of the parallel computations are not identical, possibility of manipulation due to DFA is detected. This system is however vulnerable to DPA attacks.

Thus it may be seen that technologies comprising state of the art have critical shortcomings, requiring novel solutions for protection of (cryptographic) computational devices against all types of attacks, including DFA and DPA attacks, as recited hereinafter.

OBJECTIVES

The principal object of the present invention is to create a high level of security against DPA and/or DFA attacks on computational devices having multiple cores.

The above object is achieved by a method for detection and deployment of countermeasures against DPA/DFA attacks on computational devices according to claim 1. The random designation of the scheduler function to one of the plurality of cores leads to a randomness in execution flow. Therefore, the execution flow is capable to resist security threats initiated on the cryptographic device. The security threats are e.g. caused by non-invasive attacks based on differential power analysis or differential fault analysis.

Advantageous embodiments of the invention are specified in dependent claims.

According to an embodiment of the present invention, the execution flow comprises a plurality of operation cycles, and the random designation of the scheduler function is performed newly for each new operation cycle.

A business logic unit is according to one embodiment embodied to perform a cryptographic function such as a cryptographic algorithm.

Optionally, according to claim 3, the group of business function related execution units comprise at least one each among: a business logic unit; and a redundant business logic unit causing the business logic unit to be executed at least twice as a measure for comparative verification of data integrity. According to this embodiment, in addition to randomization of claim 1, redundancy is added to the execution flow, and the opportunity of data integrity check is created. Thus, according to the embodiment of claim 3, the scheduler on the designated master core generates a both randomized and redundant and verifable execution flow having enhanced resistance against security threats.

The comparing of the results is, according to embodiments of the invention, performed at critical points in the execution flow, such as in cryptographic algorithms, at beginning/end of rounds of a multi-round algorithm, before/after performing any security sensitive operation, before passing fo data on for further processing to a next execution unit, before forwarding of a result of an algorithm to an operating system, and the like.

Depending on a comparing result of comparing the computational results, one or more defense measures may be initiated, e.g. one or more of the per se known measures of claim 6.

According to a further embodiment, a delay unit may be provided so as to impose, in addition, delay onto the execution flow. According to a further embodiment, a power consumption control unit is provided, performing pretentious execution of a cryptographic algorithm as a measure to generate a fictitious energy consumption signal. In particular, a thus achieved randomized execution and delay of the execution flow rendered by concerted execution of the security function related execution units and scheduler function related execution units causes the system to attain unpredictability and contain fictitious energy consumption signals as a countermeasure to allow check integrity of execution flow and to resist security threats.

The group of security function related execution units may further comprise a crypto unit controlling execution of the business logic unit, e.g. by performing a PIN check.

The group of scheduler function related execution units may further comprise a booting booting a secure operating system on the master core and/or an initialization unit initializating other cores, and may further comprise a separate boot up unit for initiating the initialization unit.

Referring back to claims 1 to 4, it can be seen that the operation process/cycle is randomized via a specific scheduler due to which the execution units are allocated at random to the available processing cores. Delays may be introduced, again at random, between successive execution units so that security attacks based on chronometric prediction of execution sequences are avoided. Yet furthermore, selection of master core for initiation/boot sequence may also be randomized to make impossible any prediction of the processing sequence/queue, thereby not allowing for any planned security attacks. Overall, the orchestration of process execution scheme so enabled makes it unintelligible/to manifestation of conventionally known attack protocols and thus be a constitutive effective deterrent countermeasure itself against security threats.

These objects, together with other objects and advantages which will become subsequently apparent, reside in the detailed description set forth below in reference to the accompanying drawings and furthermore specifically outlined in the claims.

BRIEF DESCRIPTION OF THE DRAWINGS

In the narration herein below, the present invention is explained in further detail based on exemplary embodiments and by reference to certain drawings, in which:

FIG. 1 is a schematic illustration to explain the execution scenario according to an embodiment of the present invention.

FIG. 2 lists the security attacks capable of being resisted by method of the present invention.

Attention of the reader is now requested to the detailed description to follow which narrates a preferred embodiment of the present invention and further indicates the various ways in which principles of the invention may be employed.

DETAILED DESCRIPTION

The present invention is directed towards creation of a high level of security against DPA and/or DFA attacks on cryptographic devices having multiple cores in a manner independent of external detectors or dedicated hardware sensors.

Reference is now made to a preferred but non-limiting embodiment of the present invention explained in reference to accompanying drawings.

FIG. 1 illustrates the high level hardware architecture proposed considering a multi core CPU having three cores Core 1, 2, 3. Here, the code and data sections are shared by the available cores and have access through a common system bus. Concept of the present invention is intended to be scalable for systems having more than one core where the business logic is broken down into multiple execution units which may then be scheduled for execution randomly and/or in parallel on different cores.

Conceptually, security in a cryptographic device depends on integrity of data and its execution. The present invention addresses these aspects by providing for distinct software checks that help to detect any instance of manipulation and/or security breach and accordingly cater appropriate countermeasures to avoid leakage of information.

According to one aspect of the present invention, integrity of data is checked by executing the same part of code reiteratively. Results from prior execution or from a standard library store are then compared to the latest computed result and deviations, if any, are assumed to be determinants of compromise in security of the device indicative of DFA attacks.

According to another aspect of the present invention, integrity of execution is checked by confirming the control flow. This is done by executing all the execution units involved in a particular scenario more than once. Any deviation, therefore is a determinant of security breach due to SPA/DPA attacks.

In the performance of execution integrity check as per one embodiment of the present invention, the execution units are categorized according to their function subscribed in the proposal scripted for execution of a particular business case scenario. The present invention assumes these units to be atomic in nature.

Accordingly, business logic units are a category of execution units representing the use scenario and, for execution of an actual business scenario, may be broken down into two or more independent execution subunits.

Redundant business logic units are the next category of execution units which are otherwise same as the business logic unit except that their role subscribed is to ensure the business logic units get scheduled at least twice for redundant execution as a measure to detect data security breaches.

Observe and check units are the next category of execution units which serve to observe the control flow and consistency of results between the business logic unit and redundant business logic units. At predetermined points the control flow or results are compared and inconsistency, if any, is understood as a security threat. These predetermined points could be—
1) within the cryptographic algorithm like DES, RSA, AES etc,
2) in case if algorithm comprises of multiple rounds then at the beginning and/or end of each round,
3) before and/or after performing any security sensitive operation like PIN comparison or MAC verification,
4) before the data is passed on for further processing to next block, etc.

Upon determination of checkpoints as provided above, the observe and check unit initiates an appropriate countermeasure which can comprise of one or more of the operations such as—
1) permanently or temporarily locking the device from further use;
2) deleting sensitive data in volatile and nonvolatile memory;
3) incrementing an error counter;
4) aborting the current operation by returning the possible erroneous response to hide the detection of the attack etc.

Scheduler units are the next category of execution units which schedule different execution units as per the scheduling algorithm subscribed. Optionally, the algorithm construct is made to randomize the scheduling process so that a new order of execution units is scripted every time and predicting the control flow even from intermediary information is not possible, thereby countering both DPA and DFA attacks.

Initialization units are the next category of execution units which perform the initial bring up of the system and may optionally comprise a boot up unit that initiates the scheduler unit.

Delay units are the next category of execution units which may be induced by the scheduler unit at random intervals as a default measure or alternatively, when no execution unit is free. Either way, the execution sequence is accordingly punctuated in a random manner which is impossible to predict and therefore, no knowledge can be had for aiding information acquisition by external attacks.

Power hog/power consumption units are the next category of execution units subject to being induced by the scheduler unit and whose operation is pretentious of executing complex algorithms like cryptography. The power signal generated is therefore a deliberate hoax for DPA attacks and therefore a security measure for the cryptographic device involved.

Crypto units are the next category of execution units for execution of the actual cryptographic algorithm.

Example 1: Execution Scenario

FIG. 1 shows a typical execution scenario according to one exemplary embodiment of the present invention where the cryptographic device comprises three processor cores, and business logic is broken into 2 execution units A and B. According to this proposal, for a duration of 5 execution units on 3 cores, a total of 15 execution units are executed in the composition:
1) 4 business related execution units (A, B, A', B')
2) 6 security related execution units (delay, power hog/ power consumption, crypto)
3) 5 scheduler related execution units (init/scheduler, check)

One of the cores (Core #1 for purpose of this example) shall act as the master and will have control during the initialization or power-on sequence and will after power-on on run a scheduler unit. The execution unit marked "init", once executed on Core #1, shall boot the secure operating system on Core #1 and initializes other cores. The scheduler execution unit marked "init" then identifies the execution units from the business logic (A, B) and then prepares the execution queues for the all the cores under framework of following rules:
a) There are at least two execution cycles for units A and B;
b) Execution of units A and B is randomized;
c) All units are executed on at least two different cores;
d) To the extent the execution units are not sequential, their executions are optimized/parallelized as per processor core availability for best speed and unpredictability to external attacks;
e) Gaps, if any, between two valid business logics are stuffed with random security related execution units wherein such stuffing is controlled by adding 'critical section' in the business logic to reduce any performance related overheads;
f) Security related execution units to check consistency of execution flows and data results of the individual execution units is inserted whenever the results to be compared are available (As soon as A and A' are available as shown in FIG. 1); and
g) At end of the execution sequence described above the scheduler places itself in queue of one of the cores selected at random (Core #3 as shown in FIG. 1) and marking that core as the master for scheduling the next business logic.

Optionally, the redundant execution units (A and A' in FIG. 1) are compulsorily made to execute on different cores so that the core occupancy is kept maximally available for actual business logic units.

Redundant execution, in accordance with principles of the present invention explained above, ensures that the same execution unit is executed twice and results compared for integrity of data as well as execution flows. As the same execution unit is executed twice on different cores, security attacks manifested in resetting of counters using ultraviolet light or other means and/or skipping of execution logic is avoided.

Randomization, in accordance with principles of the present invention explained above, ensures that the execution units are executed at random and thereby insulating the system from security attacks that require establishment of an execution pattern evident from the power consumption signals, altering of voltage levels and preventing non-volatile memory writes.

Delayed/punctuated execution, in accordance with principles of the present invention explained above, ensures introduction of unpredictability into the execution sequence and therefore, protection against security violations that require monitoring of the power consumption footprints and other secondary data for manifesting the security breach.

To summarize, arrangement of redundant, randomized and punctuated execution of business logic on a multi-core system forms the inventive core of the present invention. FIG. 2 lists the attacks on security of a cryptographic device that can be prevented on implementation of the method provided for by the present invention.

An important feature of the present invention is that no hardware or other peripherals are involved for detection of the security threat. Entirely, the objects of detection and catering countermeasures are ably provided for on a software basis alone. FIG. 2 lists the attacks on security of a cryptographic device that can be prevented on implementation of the method provided for by the present invention.

The invention claimed is:

1. A method for protecting a computational device having a plurality of processing cores from security threats, said method comprising the steps of:
defining a library of execution units functionally grouped into business function related units, security function related units and scheduler function related units, wherein the business function related units include at least a first and a second business related unit;
designating at random one among the plurality of processing cores on the computational device to as a master core for execution of the scheduler function related execution units; and
causing, under control of the scheduler, execution of the library of execution units, so as to result in a randomized execution flow, the randomized execution being randomized in a manner that at least partially resists one or more security risks initiated on the computational device that rely on a non-randomized execution, wherein the first and second business related units are executed on separate cores,
wherein the computational device is designed to operate by execution of multiple operational cycles, wherein the designated master core for execution of the scheduler functions randomly selects a new master core for execution of the scheduler function for a subsequent operational cycle.

2. The method of claim 1, wherein the group of business function related execution units further comprise at least one each among:
a business logic unit; and
at least one redundant business logic unit;
and wherein both the business logic unit and the at least one redundant business logic unit are executed, so as to generate at least two computational results.

3. The method of claim 2, wherein the group of scheduler function related execution units further comprises an observation and checking unit performing comparing the computational results of the business logic unit and redundant business logic unit, as a measure for comparative verification of data integrity.

4. The method according to claim 3, wherein the comparing of the computational results is performed at any one or more of the following points:
within a cryptographic algorithm;
at the beginning and/or end of each round of an algorithm comprising multiple rounds;
before and/or after performing any security sensitive operation; and/or
before data is passed on for further processing to a next execution unit.

5. The method of claim 3, wherein, in the case that according to the comparing of the computational results the results are different, a defense measure is initiated, including one or more of the following:
permanently or temporarily locking the computational device from further use;
deleting sensitive data in volatile and nonvolatile memory of the computational device;
incrementing an error counter; and/or
aborting the current operation by returning the possible erroneous response to hide detection of the attack.

6. The method of claim 1, wherein the group of security function related execution units further comprise a delay unit performing randomly introducing latency between various execution units as a measure to introduce unpredictability into the execution flow.

7. The method of claim 1, wherein the group of security function related execution units further comprise a power consumption control unit performing pretentious execution of a cryptographic algorithm as a measure to generate a fictitious energy consumption signal.

8. The method of claim 1, wherein the group of security function related execution units further comprise a crypto unit controlling execution of the business logic unit.

9. The method of claim 1, wherein the group of scheduler function related execution units further comprises a booting and/or initialization unit performing booting a secure operating system on the master core and/or initialization of other cores.

10. The method of claim 9, wherein the group of scheduler function related execution units further comprises a separate boot up unit for initiating the initialization unit.

11. The method of claim 1, wherein the computational device is smart card.

12. The method of claim 1, wherein the computational device is smartphone, tablet PC or mobile phone.

* * * * *